United States Patent [19]

Nakagome et al.

[11] 4,257,675
[45] Mar. 24, 1981

[54] OPTICAL-FIBER SUBMARINE CABLE AND MANUFACTURING METHOD THEREOF

[75] Inventors: Yukio Nakagome; Yasuhiko Niiro, both of Yokohama; Hiroharu Wakabayashi, Tokyo; Makoto Nunokawa, Kawasaki, all of Japan

[73] Assignee: Kokusai Denshin Denwa Kabushiki Kaisha, Tokyo, Japan

[21] Appl. No.: 22,143

[22] Filed: Mar. 20, 1979

[30] Foreign Application Priority Data

Mar. 31, 1978 [JP] Japan ................................. 53/36579

[51] Int. Cl.³ .............................................. G02B 5/16
[52] U.S. Cl. ........................................ 350/96.23; 57/3; 57/6; 57/17
[58] Field of Search ............... 350/96.23; 57/3, 6, 57/17; 174/113 R

[56] References Cited

U.S. PATENT DOCUMENTS 4,110,001   8/1978   Olszewski et al. ................ 350/96.23

FOREIGN PATENT DOCUMENTS 2507648   9/1976   Fed. Rep. of Germany ........ 350/96.23
2507649   9/1976   Fed. Rep. of Germany ........ 350/96.23
2508315   9/1976   Fed. Rep. of Germany ........ 350/96.23

*Primary Examiner*—Stewart J. Levy
*Attorney, Agent, or Firm*—Robert E. Burns; Emmanuel J. Lobato; Bruce L. Adams

[57] ABSTRACT

An optical-fiber submarine cable, in which a combination is provided by a thin, cylindrical pressure resisting sheath, and a reinforcing member of a cross section inserted by the thin, cylindrical pressure resisting sheath so as to divide the circular cross section of the pressure resisting sheath into a plurality of spaces and to have a required withstand pressure; and in which at least one low-loss optical fiber is inserted in each of the plurality of spaces. The combination can be fabricated by separately paying out the reinforcing member and the thin, cylindrical pressure resisting sheath, or by curving inwardly a sheet of tape being paid out.

2 Claims, 8 Drawing Figures

OPTICAL-FIBER SUBMARINE CABLE AND MANUFACTURING METHOD THEREOF

BACKGROUND OF THE INVENTION

This invention relates to a cable structure of a submarine cable system employing low-loss optical fibers as transmission media in the field of optical communication and a method for the manufacture of such a submarine cable.

Because of its advantages of such as a low loss, a wide transmission band and a light weight, an optical fiber is regarded as a promising transmission media by which a coaxial submarine cable heretofore employed will be replaced.

A submarine cable is laid under the deep sea of up to 10,000 m and exposed to a water pressure as high as about 1,000 atm. at maximum. When an optical fiber cable is received such a high pressure, the optical fiber slightly bends due to nonuniformity in the thickness of a material coated thereon, resulting in markedly degraded transmission characteristic. Further, the optical fiber is made of silica glass or optical glass of small loss and hence is brittle and may be broken when greatly bent. Since the optical fiber is thus made of glass, when it is immersed in sea water for a long period of time, its mechanical property and transmission characteristic are degraded. To avoid this, it has already been proposed to house the optical fiber for the submarine cable in a high pressure resisting pipe (Japanese Pat. Disc. No. 99032/76). Since the high-pressure resisting pipe increases its thickness with an increase in its inner radius, it is necessary in the manufacture of the pressure resisting pipe to minimize its diameter. In a case of inserting one optical fiber into the pipe, its diameter may be reduced, but in a case of inserting a plurality of optical fibers in the pipe, reduction of the pipe diameter is difficult if the pipe is adapted to be used both as a pressure resisting pipe and a power feeding conductor or the like. In the optical-fiber submarine cable, it is necessary from the economical point of view to increase the number of optical fibers utilizing their small diameter as well as to transmit a large quantity of information utilizing the wide transmission band property of the optical fibers themselves. It is also possible to employ such a method of increasing the number of fibers by protecting each optical fiber with a pipe but, in this case, a space loss by division occurs in the manufacture of pipes. In view of the above, it is desirable to house a plurality of optical fibers in one pressure resisting pipe, but in the prior art, since an increase in the inner diameter of the pipe causes an increase in the pipe thickness, it is difficult to manufacture a thick pipe while inserting optical fibers at the center thereof.

SUMMARY OF THE INVENTION

An object of this invention is to overcome such a defect and to provide an optical-fiber submarine cable which employs a pressure resisting, relatively thin and cylindrical sheath having inserted therein a member for enhancing its pressure resisting property and further to provide a method for the manufacture of such a submarine cable.

BRIEF DESCRIPTION OF THE DRAWINGS

This invention will hereinafter be described in detail below with reference to the accompanying drawings, in which.

DESCRIPTION OF THE PREFERRED EMBODIMENTS

Figure 1:
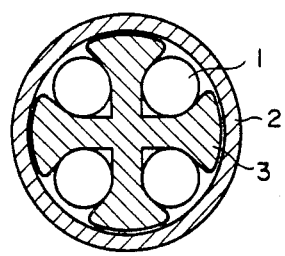
FIG. 1 is a cross-sectional view explanatory of an example of this invention.

FIG. 1 illustrates an embodiment of this invention, in which four low-loss fibers such as single mode fibers, multimode fibers or grouped fibers and housed in a thin cylindrical pressure resisting layer. In FIG. 1, reference numeral 1 indicates optical fibers; 2 designates a thin cylindrical pressure resisting sheath or cover made of plastic, aluminum, copper or like material; and 3 identifies a reinforcing member made of plastic, aluminum, copper or like material for increasing the mechanical strength of the cylindrical pressure resisting layer 2. The fibers 1 are inserted in spaces defined by the above-said reinforcing member 3 in the thin cylindrical layer 2 and, in this case, a gap may also be provided between the pressure resisting layer or sheath 2 and the reinforcing member 3 for inserting an adiabatic member therein so as to prevent the heat produced during the fabrication of the pressure resisting layer 2 is transmitted to the optical fibers, or for inserting a pressure buffer layer therein so as to prevent that a force applied to the pressure resisting layer is transmitted directly to the optical fibers. It is also possible to replace a required one or ones of the plurality of optical fibers 1 by power feeding conductors or tension members. The reinforcing member 3 or the pressure resisting layer 2 may also be used as a power feeding conductor by forming it of a material having high electrical conductivity.

Figure 2:
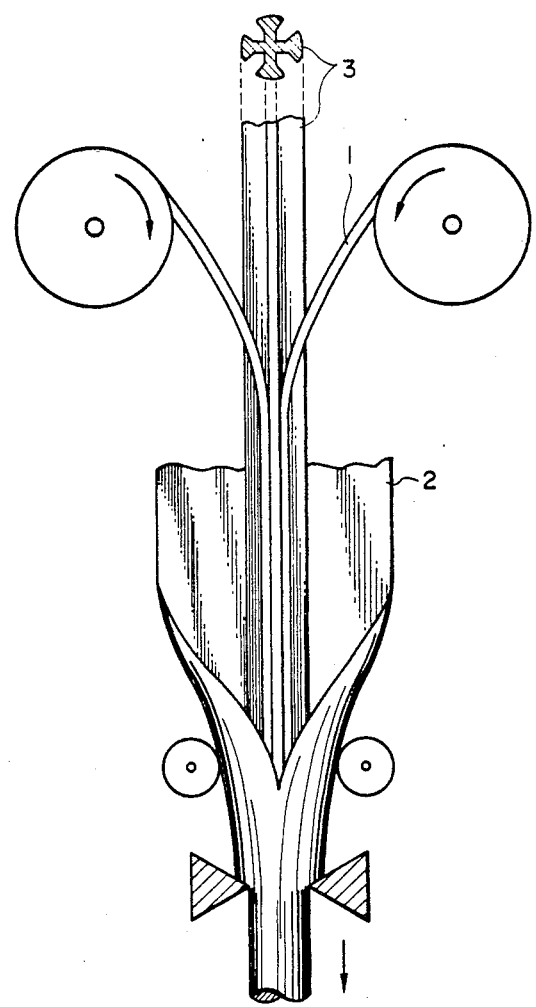
FIG. 2 is a schematic plan view explanatory of the manufacturing method of this invention.

The high-pressure resisting layer having housed therein a plurality of optical fibers in accordance with this invention can easily be fabricated by paying out the reinforcing member 3 in its finished form or while making it, extending the optical fibers 1 along the reinforcing member 3 being paid out and then extruding the thin, cylindrical pressure resisting layer 2. In this manner, the high-pressure resisting layer can be associated with the optical fibers extending along the reinforcing member of a rectilineal configuration, by which it is possible to provide marked reduction in a change of optical fiber loss in the process of inserting the optical fibers 1 into the pressure resisting layer 2. The pressure resisting layer is fabricated by extruding polycarbonite or vinyl chloride, or forming a metallic tape by means of rollers into a cylindrical shape. FIG. 2 shows an example of such a manufacturing method. Reference numeral 1 indicates optical fibers being paid out; 2 designates a metallic tape as of copper being paid out to form a cylindrical pressure resisting layer; and 3 identifies a reinforcing member to be inserted into the cylindrical pressure resisting layer 2. In this example, the reinforcing member 3 is shown to make contact with the pressure resisting layer 2 at four places but may be formed to contact the layer at a desired number of places.

Figure 3:
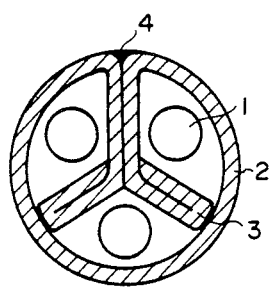
FIGS. 3 and 5 are cross-sectional views explanatory of other examples of this invention.
Figure 4:
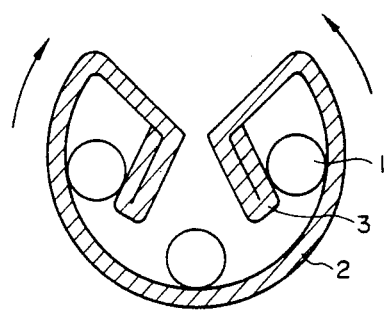
FIG. 4 is a cross-sectional view explanatory of the manufacturing process of the example shown in FIG. 3.

FIG. 3 shows another embodiment of this invention, in which a sheet-like tape as of copper, aluminum or the like is formed into a cylindrical shape to produce the cylindrical pressure resisting layer 2 and the reinforcing member 3 in one step. In FIG. 3, reference numeral 1 indicates optical fibers; 3 designates a reinforcing member for increasing the mechanical strength of a pressure resisting layer; 2 identifies the pressure resisting layer; and 4 denotes a welding joint or an adhesive binder. FIG. 4 illustrates a step in the manufacturing process for forming the pressure resisting layer 3 shown in FIG. 3. A sheet-like tape is formed first into such a shape as shown in FIG. 4 and, after insertion of a required number of optical fibers 1, rolled into a cylindrical shape, as indicated by arrows, and then fixed as by welding at the joint, as indicated by 4 in FIG. 3. With this method, it is very easy to fabricate a pressure resisting layer having built therein a reinforcing member.

Figure 5:
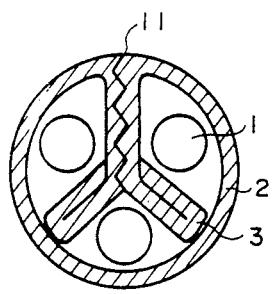

FIG. 5 shows an example in which a joint 11 is formed zigzag to increase the area of contact between the mating surfaces thereby providing for enhanced airtightness. In FIG. 3, the reinforcing member 3 is shown to have three legs, but it is needless to say that a reinforcing member with a desired number of legs can also be produced by this method.

Figure 6:
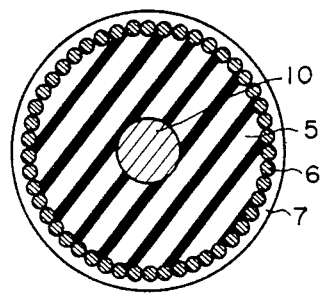
FIGS. 6, 7 and 8 are cross-sectional views explanatory of other examples of this invention.
Figure 7:
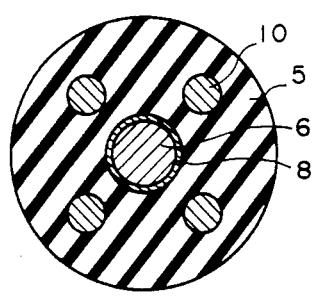
Figure 8:
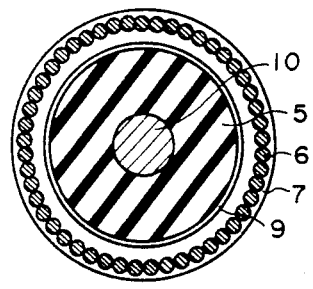

FIGS. 6, 7 and 8 respectively illustrate embodiments of an optical-fiber submarine cable employing such a pressure resisting layer for protection optical fibers from a high water pressure.

In FIG. 6, an optical fiber 10 inserted in the pressure resisting layer is disposed at the center of a submarine cable, and either one or both of the reinforcing member 3 and the pressure relating layer are formed of a material such as copper or aluminum to perform the functions of both the pressure resisting layer and a power feeding conductor. On the outside of the pressure resisting layer, an insulating layer 5 is covered with a material such, for example, as polyethylene, outside of which are disposed a tension member 6 and a protective jacket 7. In FIG. 7, as is the case with a conventional nonarmoured coaxial cable, the tension member 6 and a power feeding tape 8 are disposed at the center of a cable and covered with an insulator such as polyethylene, and optical fibers 10, each inserted in the pressure resisting layer, are arranged in the insulator in spaced relation to one another so as not to apply a pressure to their particular portions. In FIG. 8, an optical fiber inserted in the pressure resisting layer is disposed at the center of a cable and at least the cylindrical member of the pressure resisting layer is made of a material having high electrical conductivity such as, for example, copper or aluminum. A conductor 9 is disposed concentrically with the cylindrical member and an insulator such as polyethylene is packed between the pressure resisting layer and the conductor 9 to provide the function of a coaxial cable. In FIG. 8, reference numeral 6 indicates an armour line serving as a tension member, and 7 designates a protective jacket. The embodiment illustrated in FIG. 8 may be used as a submarine cable for transmitting information to and controlling of various submarine equipments, utilizing the wide transmission band property of an optical fiber and the simplicity of an electric circuit of the coaxial cable.

As has been described above, according to this invention, by inserting a reinforcing member in a pressure resisting layer, a thin cylindrical member can be used and a pressure resisting layer easy to fabricate can be realized. Further, this pressure resisting layer can also be produced with a sheet of tape. With this invention, as described above, it is possible to produce a pressure resisting layer in which an optical fiber extends along a member for reinforcing the pressure resisting layer, so that the optical fiber can be held straight, preventing loss of the optical fiber which is caused by using it in a cable. By making such a reinforcing member of a material having high electrical conductivity, it can also be used as a power feeding conductor and an optical fiber submarine cable can be realized which withstands a high water pressure and is simple in construction.

What we claim is:

1. An optical-fiber submarine cable comprising:
   a combination body formed, as one body, from a sheet-like tape into a cylindrical-pressure resisting sheath and a reinforcing member of a cross section extending longitudinally in the cylindrical pressure-resisting sheath by curving inwardly both marginal longitudinal edge portions of the sheet-like tape, said reinforcing member having a cross section composed of at least three radial portions extending radially from the center thereof in the cylindrical pressure resisting sheath so as to provide at least three longitudinally extending spaces separated by said at least three portions, the marginal longitudinal edge portions of the cylindrical pressure resisting sheath being joined together, and
   at least one low-loss optical fiber extending longitudinally in each of said at least three longitudinally extending spaces.

2. A method for the manufacturing of an optical-fiber submarine cable comprising the steps of: curving inwardly both marginal longitudinal edge portions of a sheet-like tape being paid out longitudinally and forming, as one body, a cylindrical outer sheath about a longitudinally elongated reinforcing member having a cross section composed of at least three portions extending radially from the center thereof in the outer sheath, at the same time paying out longitudinally a required number of optical fibers in position to extend along the reinforcing member disposed in respective spaces separated by said at least three radially extending portions; and joining the longitudinal edge portions of the outer sheet-like tape to form the sheath in a state wherein a desired number of optical fibers are housed in the sheath each in a respective one of said at least three spaces.

* * * * *